(12) United States Patent
Mora et al.

(10) Patent No.: US 10,706,507 B2
(45) Date of Patent: Jul. 7, 2020

(54) HYBRID DENOISING OF IMAGES AND VIDEOS BASED ON INTEREST METRICS

(71) Applicant: ATEME, Velizy Villacoublay (FR)

(72) Inventors: Elie Gabriel Mora, Paris (FR); Pierre Larbier, Bievres (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 15/850,547

(22) Filed: Dec. 21, 2017

(65) Prior Publication Data

US 2018/0182072 A1    Jun. 28, 2018

(30) Foreign Application Priority Data

Dec. 22, 2016 (FR) ...................... 16 63240

(51) Int. Cl.
*G06K 9/00* (2006.01)
*G06T 5/00* (2006.01)
(Continued)

(52) U.S. Cl.
CPC .............. *G06T 5/002* (2013.01); *G06T 7/11* (2017.01); *G06T 7/136* (2017.01);
(Continued)

(58) Field of Classification Search
CPC .................................................. G06T 5/002; G06T 7/136; G06T 7/11; H04N 19/136; H04N 19/46; H04N 19/177; H04N 19/142

See application file for complete search history.

(56) References Cited

U.S. PATENT DOCUMENTS

| 6,633,683 B1 * | 10/2003 | Dinh ........................ G06K 9/40 345/611 |
| 7,542,622 B1 * | 6/2009 | Angelini .................. G06K 9/40 382/275 |

(Continued)

FOREIGN PATENT DOCUMENTS

WO    2016/185079 A1    11/2016

OTHER PUBLICATIONS

Chen et al, "An intelligent video noise reduction method using adaptative spatial and motion-compensation temporal filter", IEEE Conference on Computational Photography 2003, Department of Electronic Engineering, National Kaohsiung University of Applied Sciences.

(Continued)

*Primary Examiner* — Amir Alavi
(74) *Attorney, Agent, or Firm* — Young & Thompson (57) ABSTRACT

Disclosed is a method for processing noise in a digital image having multiple image portions, including: (a) Predefining: criteria of interest for denoising selected details of any image portion of the digital image; a plurality of possible processing procedures to be applied to an image portion in order to denoise the selected details, each processing procedure having an efficiency related to an associated complexity level, the possible processing procedures being ordered by increasing complexity level; (b) For each portion of the image: analyzing the image portion to quantify the presence of one or more of the selected details in the image portion, and calculating an overall interest of the image portion as a function of respective quantifications of the presences of the selected details; comparing the overall interest at the complexity levels, in order to launch the processing procedure having the complexity level corresponding to the calculated overall interest.

11 Claims, 5 Drawing Sheets

(51) Int. Cl.
G06T 7/136 (2017.01)
G06T 7/11 (2017.01)

(52) U.S. Cl.
CPC ............... *G06T 2207/20012* (2013.01); *G06T 2207/20021* (2013.01); *G06T 2207/20164* (2013.01)

(56) References Cited

U.S. PATENT DOCUMENTS

| | | | | |
|---|---|---|---|---|
| 8,184,927 | B2* | 5/2012 | Lankoande | G01S 13/9035 382/260 |
| 8,280,185 | B2* | 10/2012 | Demandolx | G06K 9/40 375/240.1 |
| 8,437,568 | B2* | 5/2013 | Hou | G06T 5/002 382/254 |
| 8,478,389 | B1* | 7/2013 | Brockway | A61B 5/7203 600/509 |
| 8,965,078 | B2* | 2/2015 | Yu | G06T 11/005 382/128 |
| 8,977,049 | B2* | 3/2015 | Aila | G06T 5/002 348/162 |
| 9,819,849 | B1* | 11/2017 | Rivard | H04N 5/2256 |
| 9,986,951 | B1* | 6/2018 | Ferdosi | A61B 5/7203 |
| 2017/0150014 | A1* | 5/2017 | Liu | G06T 5/002 |
| 2017/0251191 | A1* | 8/2017 | Huang | G01N 21/6458 |
| 2018/0182072 | A1* | 6/2018 | Mora | G06T 5/002 |

OTHER PUBLICATIONS

Mosseri et al, "Combining the power of internal and external denoising", International Conference on Computational Photography, 2003, Dept. of Computer Science and Applied Mathematics, The Weizmann Institute of Science, Israel.

Bamber David C et al, "Novel adaptive Kernels for image sharpening in the presence of noise" Proc of SPIE vol. 8056 80560M.

Nevres Imamoglu et al, "A saliency detection model using low-level features based on wavelet transform" IEEE Transactions on Mutimiedia, vol. 15, -96-105 No. 1, Jan. 2013.

Shao-Ping Lu et al, "Saliency-based fidelity adaptation preprocessing for video coding" Journal of Computer Science, and Technology 26 1 : 195-202 Jan. 2011, Department of Computer Science and Technology, Tsinghua University.

LaTo. "MCTemporalDenoise." Avisynth Wiki. May 1, 2017. v1.4. 20. Web. http://avisynth.nl/index.php/MCTemporalDenoise.

LaTo. "MCTemporalDenoise Download." Avisynth Wiki. Jul. 2, 2010. v1.4.20. Web. http://latoninf.free.fr/d9/MCTD/MCTemporalDenoise.v1.4.20.avsi.

Balakhnin, A.G. aka Fizick. plugin for Avisynth 2.5. "FFT3DFilter." Version 2.1.1. 2007.

Le Tanou, Julien. "Analyse et modelisation du grain dans un flux vidéo (Rapport de stage de fin d'études)." Jul. 2008.

Tritical. "TBilateral for Avisynth v2.5.x." v0.9.11. May 16, 2006.

El Naqa, Issam, Joseph O. Deasy, and Milos Vicic. "Locally adaptive denoising of Monte Carlo dose distributions via hybrid median filtering." 2003 IEEE Nuclear Science Symposium. Conference Record (IEEE Cat. No. 03CH37515). vol. 4. IEEE, 2003.

Kovac, Jure, Peter Peer, and Franc Solina. "Human skin colour clustering for face detection." vol. 2. IEEE, 2003.

Manus, Justin. "A super-simple skin detector in OpenCV." Spottr Labs, Inc., Jan. 20, 2012. spottrlabs.blogspot.com/2012/01/super-simple-skin-detector-in-opencv.html.

Srivastava, Devesh Kumar, and Tarun Budhraja. "An effective model for face detection using R, G, B color segmentation with genetic algorithm." Proceedings of First International Conference on Information and Communication Technology for Intelligent Systems: vol. 2. Springer, Cham, 2016.

Achanta, Radhakrishna, Francisco Estrada, Patricia Wils, and Sabine Süsstrunk. "Salient region detection and segmentation." International conference on computer vision systems. Springer, Berlin, Heidelberg, 2008.

Meddeb, Marwa, Marco Cagnazzo, and Beatrice Pesquet-Popescu. "Region-of-interest-based rate control scheme for high-efficiency video coding." APSIPA Transactions on Signal and Information Processing 3 (2014).

* cited by examiner

| ZONE 1 $I \leq S_1$ | ZONE 2 $I \leq S_1$ | ZONE 3 $I \leq S_1$ | ZONE 4 $I \leq S_1$ |
|---|---|---|---|
| ZONE 5 $I \leq S_1$ | ZONE 6 $S_1 \leq I \leq S_2$ | ZONE 7 $I \leq S_1$ | ZONE 8 $I \leq S_1$ |
| ZONE 9 $S_2 \leq I \leq S_1$ | ZONE 10 $S_2 \leq I$ | ZONE 11 $S_2 \leq I$ | ZONE 12 $S_1 \leq I \leq S_2$ |
| ZONE 13 $I \leq S_1$ | ZONE 14 $S_1 \leq I \leq S_2$ | ZONE 15 $S_1 \leq I \leq S_2$ | ZONE 16 $I \leq S_1$ |

|  | Parameter 1 | Parameter 2 | Parameter 3 | ... | Column J Parameter j | ... |  |
|---|---|---|---|---|---|---|---|
| Denoiser $D_1$ | $J_{1,1}$ | $J_{1,2}$ | $J_{1,3}$ | ... | $J_{1,j}$ | ... | $J_{1,Y1}$ |
| Denoiser $D_2$ | $J_{2,1}$ | $J_{2,2}$ | $J_{2,3}$ | ... | $J_{2,j}$ | ... | $J_{1,Y2}$ |
| Denoiser $D_3$ | $J_{3,1}$ | $J_{3,2}$ | $J_{3,3}$ | ... | $J_{3,j}$ | ... | $J_{1,Y3}$ |
|  | ... | ... | ... | ... | ... | ... | ... |
|  | ... | ... | ... | ... | ... | ... | ... |
|  | ... | ... | ... | ... | ... | ... | ... |
| Row i  Denoiser $D_i$ | $J_{i,1}$ | $J_{i,2}$ | $J_{i,3}$ | ... | $J_{i,j}$ | ... | $J_{i,Yi}$ |
|  | ... | ... | ... | ... | ... | ... | ... |
|  | ... | ... | ... | ... | ... | ... | ... |
|  | ... | ... | ... | ... | ... | ... | ... |
|  |  | ... | ... | ... | ... | ... | ... |
| Denoiser $D_X$ | $J_{X,1}$ | $J_{X,2}$ | $J_{X,3}$ | ... | ... | ... | $J_{X,YX}$ |

FIG. 6

HYBRID DENOISING OF IMAGES AND VIDEOS BASED ON INTEREST METRICS

BACKGROUND OF THE INVENTION

Field of the Invention

The present invention lies in the field of image and video processing, more specifically in the field of processing digital noise in images and videos. The invention relates to a method for processing digital noise of a digital image, called "denoising".

Digital images and videos presented in the form of digital data contain unwanted information. This unwanted information is not related to the original image or video. When transmitting a digital signal, this unwanted information is also conveyed. In the field of signal processing, this unwanted information is considered digital noise. In the case of an image or video, this digital noise appears in the form of random details. These random details are added to the details of the photographed scene or filmed sequence. The presence of digital noise affects the visual quality of a digital image or video: the greater the presence of digital noise, the more the visual quality is degraded. In addition to the fact that the presence of digital noise degrades the quality of a digital image or video, the presence of digital noise increases the required complexity of the processing which corresponds to encoding a digital image or video.

In the field of signal processing, several types of digital noise exist. For example, thermal noise may be related to the temperature of the sensor used, while the noise commonly called "salt-and-pepper" noise may be due to data transmission errors. The processing used to reduce or eliminate noise from an image or video is called "denoising." Therefore, in the rest of the description of the invention, the terms "processing" and "denoising" are used with identical meaning. Denoiser or processing type is understood to mean a filter used to perform the denoising or processing, namely to reduce or eliminate the noise present in a digital image or video.

The efficiency of a denoiser is measured by its ability to reduce or eliminate the noise present in a digital image or video while retaining the details thereof. Its efficiency can be measured using a comparison between the original image and the denoised image. It is then possible, for determining the efficiency of a denoiser, to calculate the sum of squared differences (SSD), the sum of absolute differences (SAD), or a signal-to-noise ratio (PSNR).

A denoiser is necessarily associated with a processing complexity. The complexity of a denoiser is evaluated by counting the number of operations performed to reduce or eliminate noise. It is possible that the number of operations performed is difficult to determine. In this case, the complexity of a denoiser is determined on the basis of the processing time, meaning the number of images denoised per second or the time required to denoise an image. In general, increasing the efficiency of a denoiser goes hand in hand with increasing its complexity.

Description of the Related Art

In the field of image and video processing, an efficiency/complexity ratio or compromise is often introduced. For denoising images and videos, there are several denoisers offering different compromises in efficiency/complexity. Several choices of denoisers are therefore possible for denoising an image or a video. The use of a combination of multiple denoisers to denoise an image or video is called hybrid denoising of images and videos. By extension, multiple denoisers can be used to denoise different regions within the same image.

Several works on hybrid denoising are proposed in the literature. In these works, the choice of denoisers used to denoise the different regions of the image is based on statistical metrics that characterize the noise. The use of statistical metrics characterizing the noise thus makes it possible to determine the most suitable denoiser for removing noise. In the literature, Chen et al. in "*An intelligent video noise reduction method using adaptive spatial and motion-compensation temporal filter, IEEE Conference on Computational Photography* 2003" proposes using the variance and the JND (Just Noticeable Distortion) to choose between four different denoisers for a given region. The work of Mosseri et al., "*Combining the Power of Internal and External Denoising, International Conference on Computational Photography,* 2003" combines two methods of denoising: an internal denoising method which consists of denoising an image patch using other noisy patches of the same image, and an external denoising method that consists of denoising an image patch using natural external patches that do not contain noise. The choice between the first method and the second method is based on an estimated signal-to-noise ratio at the patch level.

The hybrid denoising proposed in the literature is always adapted to the characteristics of the noise. Its goal is to improve the efficiency of the denoising over the entire image or video, the denoising complexity generally not being considered. However, in order for a denoising solution to be adopted in the industry, it is necessary for it to satisfy sometimes heavy constraints in terms of complexity. To obtain a more attractive efficiency/complexity compromise, the efficiency of a denoiser must be adjusted to the interest in the content of the image or video to be denoised. There is therefore a need to adapt the choice of one or more denoisers to the characteristics of the image rather than to those of the noise.

Figure 1A:
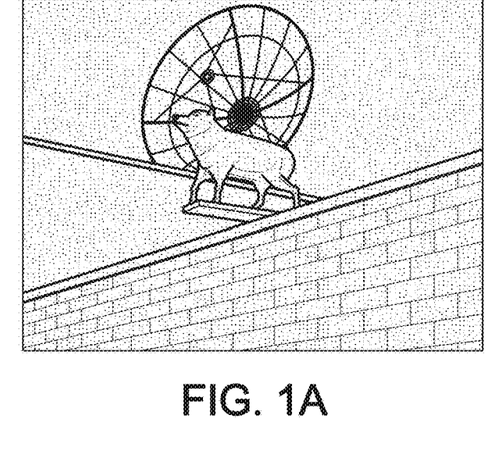
FIG. 1A represents a noisy original image.
Figure 1B:
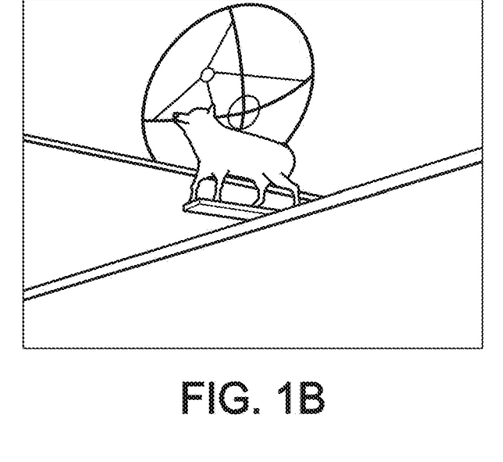
FIG. 1B represents an image denoised with a Gaussian filter.

FIG. 1A shows a noisy original image. The original image represents several buildings as well as an animal statue. FIG. 1B shows the same image obtained after denoising with a Gaussian filter, kernel size 5×5. The result obtained in FIG. 1B is relatively smooth: the details of the animal and buildings have disappeared, and only the outlines are preserved. The noise present in FIG. 1A in the form of a point cloud has been eliminated, however. The noise present in the original image has therefore been reduced in FIG. 1B.

Figure 1C:
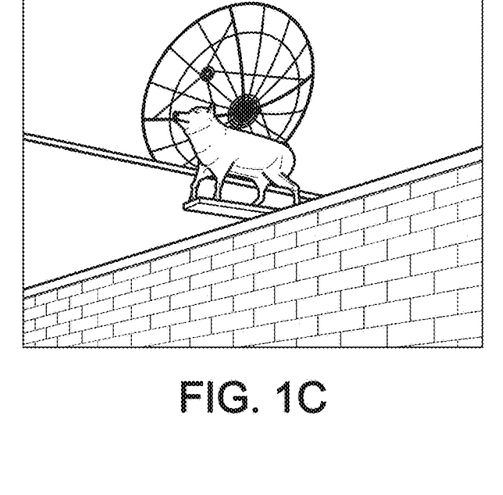
FIG. 1C represents an image denoised with a MCTemporalDenoise filter.

The use of a Gaussian filter to denoise an image is a solution of low complexity. FIG. 1C shows the original image denoised using an MCTemporalDenoise video denoiser. The details of the original image are better preserved in FIG. 1C than in FIG. 1B. This is because the MCTemporalDenoise video denoiser has a very high complexity, so it is a highly efficient denoiser.

The state of the art, as described above, concerns improving the efficiency/complexity compromise by the development of new filters, or adapting the denoising to the noise. However, a user does not have equal interest in all parts of an image. Indeed, in the example of FIGS. 1A, 1B, and 1C, the end user is relatively uninterested in the sky. It is therefore of little use to use a very high complexity denoiser such as MCTemporalDenoise to denoise the sky. The end user, however, has a higher interest in the animal or the walls of the buildings. The details of the walls and of the animal are therefore important to preserve for the end user.

Therefore, in comparison to existing hybrid denoising techniques and the example of FIGS. 1A, 1B, and 1C, there is a need to apply denoisers of greater or lesser complexity to regions of the image which are respectively of greater or lesser interest to the end user.

SUMMARY OF THE INVENTION

The present invention improves the situation.

For this purpose, a first aspect of the invention relates to a method, implemented by computer means, for processing noise in a digital image having a plurality of image portions, the method comprising:

a) Predefining:
   criteria of interest for denoising selected details of any image portion of the digital image;
   a plurality of possible processing procedures to be applied to an image portion in order to denoise said selected details, each processing procedure having an efficiency related to an associated complexity level, said possible processing procedures being ordered by increasing complexity level;

b) For each portion of the image:
   analyzing said image portion to quantify the presence of one or more of said selected details in the image portion, and calculating an overall interest of the image portion as a function of respective quantifications of the presences of said selected details,
   comparing the overall interest at said complexity levels, in order to launch the processing procedure having the complexity level corresponding to the calculated overall interest.

Thus, it is possible to adapt the choice of noise processing to the characteristics of an image rather than to that of the noise. For an image portion of little interest to the end user, a noise processing procedure of low complexity is used. In contrast, for an image portion that is of high interest to the end user, a noise processing procedure of high complexity is used.

In addition, the launched processing procedure may be the one having the complexity level immediately above the calculated overall interest or having a maximum complexity level if the overall interest is greater than the maximum complexity level.

It is thus possible to use several noise processing procedures associated with different complexity levels ordered in comparison to the calculated overall interest.

According to one embodiment, each processing procedure can be defined by at least one processing type combined with a parameter set associated with the processing type, each possible combination of processing type and associated parameter set having a processing efficiency related to a complexity level pre-estimated in step a), said possible combinations being ordered by increasing complexity level in step a).

It is therefore possible to define several combinations of noise processing type and associated set of parameters. The use of such combinations improves the efficiency/complexity compromise. Indeed, the same type of noise processing with different parameter sets provides different complexity levels. This increases the possibilities for processing an image or image portion.

According to one embodiment, each processing procedure can be defined by several combined processing types, each processing type having an associated parameter set, each possible combination of processing types having an overall processing efficiency related to a complexity level pre-estimated in step a), said possible combinations being ordered by increasing complexity level in step a).

The possibilities for processing an image or image portion are thus increased.

According to one embodiment, in step a), it is possible to predefine thresholds $(S_1, S_2, \ldots, S_{|C|-1})$, each threshold being associated with a processing procedure providing a desired denoising efficiency for an associated complexity level, and in step b), the overall interest (IG) is compared to these thresholds.

According to one embodiment, in step b), it is possible to calculate K interest metrics $M_1, M_2, \ldots, M_K$, respectively associated with the selected details, each metric being specific to one of said predefined criteria of interest predefined in step a).

Thus, it is possible to quantify the interest a user has in an image or image portion. This allows better identification of the various interests of a user in an image or image portion. For example, the interest metrics may concern the presence of a living being, human face, or writing in an image.

As an addition to step b), the overall interest IG may be calculated as a function of the K interest metrics $IG=f(M_1, M_2, \ldots, M_K)$.

Thus, the overall interest is defined as a function of several variables, the variables being the various interest metrics. It is therefore possible to assign weighting coefficients to the various interest metrics. For example, it is possible to consider a user as being twice as interested in the presence of a human face as in the presence of a tree in an image.

According to one embodiment, the digital image may be an image divided into N regions having the same dimensions.

It is thus possible, for the N regions having the same dimensions, to determine the value of each interest metric and to calculate the overall interest. Therefore it is possible to assign a noise processing procedure for each region as a function of the calculated overall interest, and to improve the efficiency/complexity compromise for the N regions of the image having the same sizes.

According to one embodiment, the digital image is an image divided into N regions having different dimensions.

It is thus possible to apply different noise processing procedures for image regions of different sizes. Indeed, in the example of an image with a human face in the center and a landscape in the background, it saves time to divide the image into regions of different sizes adapted to the content of the region. It is possible to perform denoising on a larger image region instead of performing the same denoising on smaller partitions of this region. There are therefore fewer regions to process in this case.

A second aspect of the invention relates to a computer program comprising instructions for implementing the steps of the method when these instructions are executed by a processor.

A third aspect of the invention relates to a noise processing device adapted to denoise a digital image comprising a plurality of image portions, the device comprising a processor configured to carry out the following operations:

a) Predefining:
   criteria of interest for denoising selected details of any image portion of the digital image;
   a plurality of possible processing procedures to be applied to an image portion in order to denoise said selected details, each processing procedure having an efficiency related to an associated complexity level, said possible processing procedures being ordered by increasing complexity level;

b) For each portion of the image:

analyzing said image portion to quantify the presence of one or more of said selected details in the image portion, and calculating an overall interest of the image portion as a function of respective quantifications of the presences of said selected details, comparing the overall interest at said complexity levels, in order to launch the processing procedure having the complexity level corresponding to the calculated overall interest.

BRIEF DESCRIPTION OF THE DRAWINGS

Other features and advantages of the invention will appear from the following description, with reference to the appended figures which illustrate an exemplary embodiment devoid of any limiting character and in which:

FIG. 5 illustrates a device according to one embodiment of the invention; and.

DESCRIPTION OF THE PREFERRED EMBODIMENTS

The invention relates to the use of at least two denoisers or noise processing types. Each denoiser or noise processing type can be used with several associated parameter sets. This makes it possible to use a particular noise processing type associated with a particular parameter set to apply to a particular region of an image to be denoised. For example, let us consider the sky of FIG. 1A as defining a first region of the image. It is possible to apply to this first image region of FIG. 1A a first noise processing type associated with a first parameter set. If we consider the animal of FIG. 1A as a second region of the image, it is possible to apply to this second image region a second processing type associated with a second parameter set. It is also possible to apply the first processing type associated with another parameter set.

One of the objects of the invention is to determine the combination of noise processing type and associated parameter set for a given region of the image. The determination of this combination is performed based on one or more metrics calculated for the image region in question. These metrics are intended to evaluate the interest the end user has in the image region. These metrics are therefore referred to herein as interest metrics. The greater the interest the user has in an image region, the more the use of complex combinations is necessary. If the user has a high interest in an image region, it is necessary to denoise the image region while preserving the details. If the user's interest in the image region is low, the use of low complexity combinations may be sufficient to denoise the image region effectively.

Thus, we consider a set D of at least two different denoisers or noise processing types, such that:

$$D = \frac{\{D_1, D_2, \ldots, D_X\}}{X} \geq 2,$$

and there exists $D_i$ and $D_j \in D/i \neq j$ and $D_i \neq D_j$

X is a natural number greater than or equal to 2, representing the number of denoisers.

i and j are natural numbers, representing the index of the denoiser.

Let $J_x$ be a set of parameter sets associated with a denoiser $$J_x = \{J_{x,1}, J_{x,2}, \ldots, J_{x,Y_x}\}/Y_x \geq 1$$

$Y_x$ is a natural number greater than or equal to 1, representing the number of parameter sets associated with a denoiser $D_x$.

Let C be the set, ordered by increasing complexity, of the combinations $C_{x,y}$ of a denoiser $D_x$ and of an associated parameter set $J_{x,y}$:

$$C = \{(D_x; J_{x,y})/x=1 \rightarrow X, y=1 \rightarrow Y_x, \text{ and } \text{Comp}(C_i) \leq \text{Comp}(C_j) \text{ if } i < j\}$$

Figure 6:
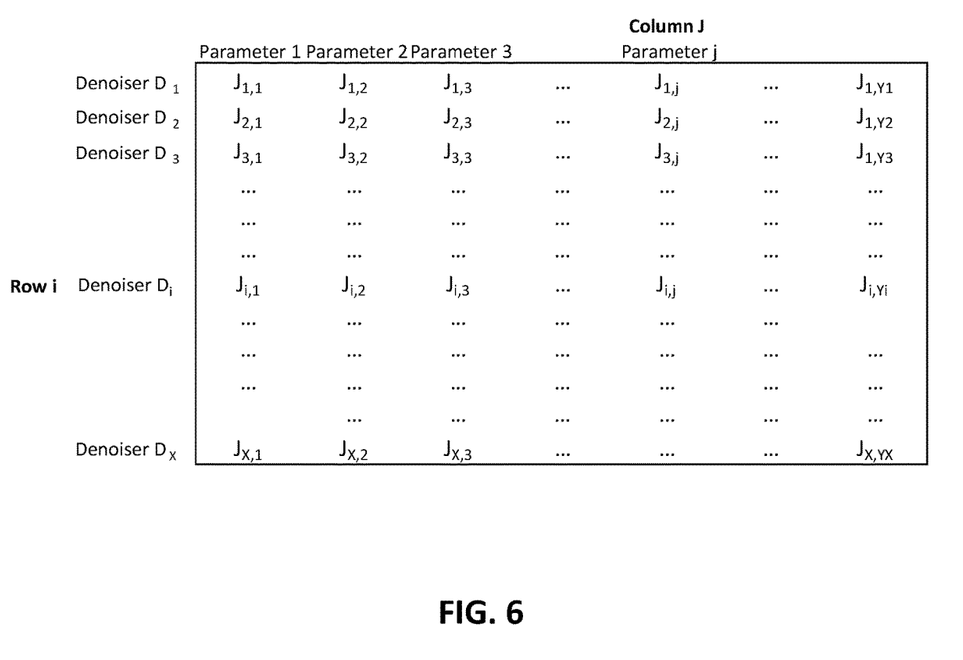
FIG. 6 illustrates a table of a set of parameter sets associated with denoisers.

It is possible to represent in table form the set of parameter sets associated with the denoisers, as illustrated in the table in FIG. 6.

The number of possible combinations or the number of coefficients of the table is therefore:

$$|C| = \sum_{i=1}^{X} Y_i$$

One will recall that the number of parameters associated with each denoiser can be different, meaning that it is possible to have $Y_1 \neq Y_2 \neq \ldots Y_X$ Let M be a set of interest metrics that can be calculated for a given image region:

$$M = \{M_1, M_2, \ldots, M_K\} K \geq 1$$

K is a natural number, greater than or equal to 1, representing the number of interest metrics.

Figure 4:
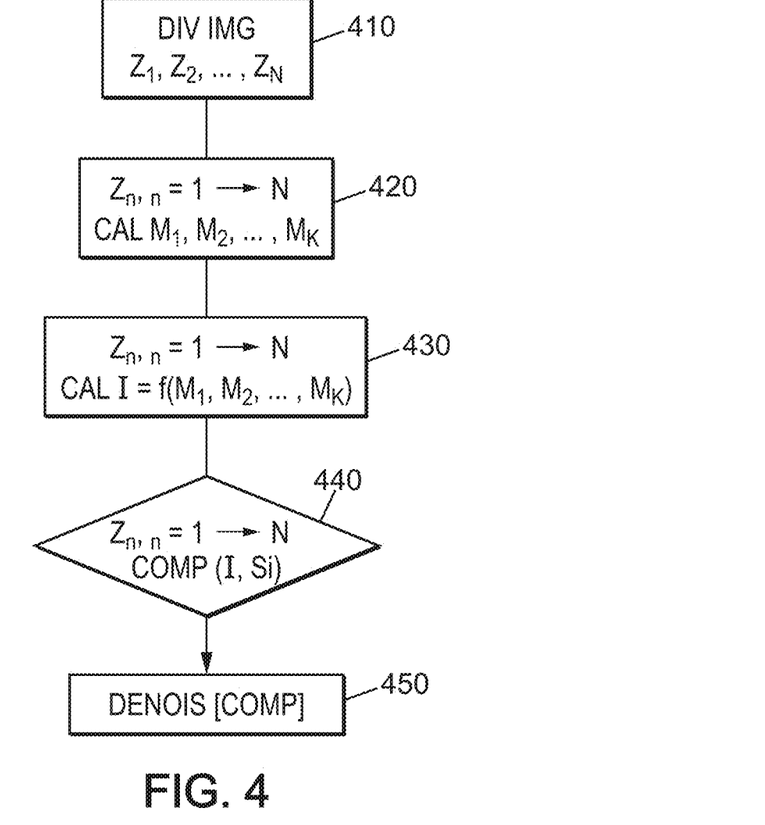
FIG. 4 illustrates steps of the noise processing method according to one embodiment of the invention.

In an exemplary embodiment with reference to FIG. 4, it may be proposed to:

divide the image to be denoised into N regions ($Z_1, Z_2, \ldots, Z_N$), (step 410 of FIG. 4)

For each region $Z_n$, $n=1 \rightarrow N$:

calculate the K interest metrics $M_1, M_2, \ldots, M_K$, (step 420)

calculate the interest I in $Z_n$ as a function of the K interest metrics: $I=f(M_1, M_2, \ldots, M_K)$, (step 430)

then compare I to $|C|-1$ thresholds: $S_1, S_2, \ldots, S_{|C|-1}/S_i < S_j$ if $i < j$ and select, to denoise $Z_n$, the combination $C_1$ if $I < S_1$, $C_i$ ($i=2 \rightarrow |C|-1$) if $S_{i-1} < I < S_i$ or $C_{|C|}$ if $I > S_{|C|-1}$, (step 440).

Then, on the basis of the comparison COMP carried out for each region $Z_n$, the appropriate denoising of this region can be carried out in the end step 450, using the combination determined for each region.

An optional step may be to merge contiguous regions together if the same combination is selected for each of the regions to be merged. In this case, the end step 450 is applied to the entire merged region.

The interest metrics M may be for example:
- a percentage of pixels detected as skin,
- a percentage of pixels detected as writing in an image
- a coherence of the motion vector field,
- a percentage of blocks in which the magnitude of the motion vector is greater than a given threshold, or
- a representative saliency value.

Other examples of metrics can be considered, of course.

Figure 2A:
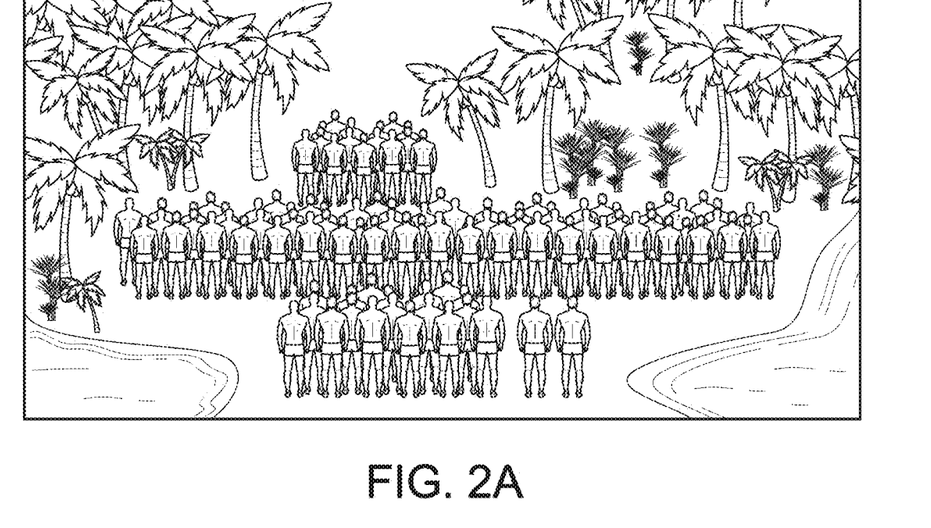
FIG. 2A represents an original image to be denoised.
Figure 2B:
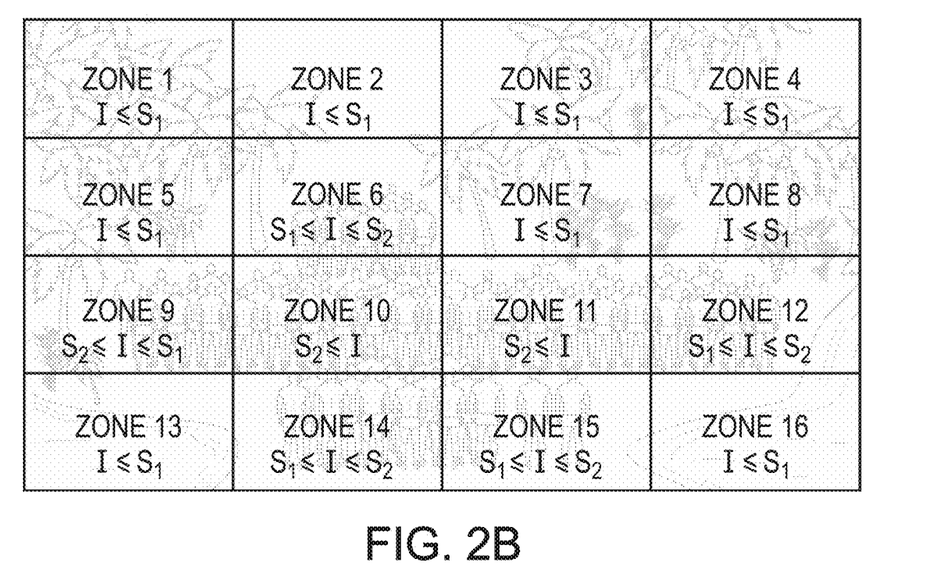
FIG. 2B represents an illustration according to a first embodiment of the invention.

FIG. 2A shows an original image to be denoised. According to a first embodiment of the invention, this original image to be denoised is divided into 16 rectangular image regions of identical sizes (FIG. 2B). The interest metrics M are defined here as being the percentage of pixels detected as human skin for each of the 16 regions of the image. In this first embodiment of the invention, only one interest metric $M_1$ is therefore considered, defined as follows:

Interest metric $M=M_1$: percentage of pixels detected as skin

The overall interest IG is a multivariable function, the variables being the different interest metrics. Consequently, for this first embodiment of the invention, the calculation of the overall interest IG is expressed as follows:

$IG=f(M_1)=M_1$: the overall interest IG is equal to the interest metric $M_1$

If the percentage of pixels detected as skin exceeds 50%, the presence of skin is considered to be confirmed. If the percentage of pixels detected as skin is between 25% and 50%, the presence of skin is considered to be partial. If the percentage of pixels detected as skin is less than 25%, the presence of skin is considered to be unconfirmed. When the presence of skin is considered to be unconfirmed for an image region, the image region is denoised with a simple Gaussian filter with a kernel size of 5. Conversely, if the presence of skin is considered to be confirmed for an image region, the image region is denoised with a 2DFFT filter with block size=32, overlap size=16, and strength=4. In the final case, meaning when the presence of skin is considered to be partial for an image region, the image region is denoised with a 2DFFT filter with an overlap size=8. Reducing the overlap reduces the complexity and efficiency of the denoising.

Denoting as X the number of denoisers, and $Y_i$ the number of parameter sets associated with denoiser $D_i$ where i=1→2, the number of possible combinations is therefore:

$|C|=\Sigma_{i=1}^{X}Y_i=\Sigma_{i=1}^{2}Y_i=Y_1+Y_2=1+2=3$

In effect, the first denoiser $D_1$ (Gaussian filter) has a single parameter set $J_{1,1}$. The second denoiser $D_2$ (2DFFT) has a set of parameter sets which contains two parameter sets: $J_{2,1}$ and $J_{2,2}$.

We therefore have: $D=\{D_1, D_2\}$
$J_1=\{J_{1,1}\}$ set of parameter sets associated with denoiser $D_1$.
$J_2=\{J_{2,1}, J_{2,2}\}$ set of parameter sets associated with denoiser $D_2$.
$C=\{C_1, C_2, C_3\}$ where C is the set of combinations $C_{x-y}$ by order of increasing complexity, where:
$C_1=(D_1; J_{1,1})$ is the combination of denoiser $D_1$ with parameter set $J_{1,1}$
$C_2=(D_2; J_{2,1})$ is the combination of denoiser $D_2$ with parameter set $J_{2,1}$
$C_3=(D_2; J_{2,2})$ is the combination of denoiser $D_2$ with parameter set $J_{2,2}$ It is then possible to define thresholds $S_i$ which are therefore:

$|C|-1=3-1=2$ in number. The thresholds used are therefore the following: $S_1=25$ and $S_2=50$ In FIG. 2B, the original image subdivided into 16 regions represents a comparison of the overall interest calculated for each of the 16 regions relative to the thresholds $S_1$ and $S_2$ defined above.

Region 1, I≤S1 application of combination $C_1=(D_1; J_{1,1})$ for denoising
Region 2, I≤S1 application of combination $C_1=(D_1; J_{1,1})$ for denoising
Region 3, I≤S1 application of combination $C_1=(D_1; J_{1,1})$ for denoising
Region 4, I≤S1 application of combination $C_1=(D_1; J_{1,i})$ for denoising
Region 5, I≤S1 application of combination $C_1=(D_1; J_{1,1})$ for denoising
Region 6, S1≤I≤S2 application of combination $C_2=(D_2; J_{2,1})$ for denoising
Region 7, I≤S1 application of combination $C_1=(D_1; J_{1,i})$ for denoising
Region 8, I≤S1 application of combination $C_1=(D_1; J_{1,1})$ for denoising
Region 9, S1≤I≤S2, application of combination $C_2=(D_2; J_{2,1})$ for denoising
Region 10, S2≤I application of combination $C_3=(D_2; J_{2,2})$ for denoising
Region 11, S2≤I application of combination $C_3=(D_2; J_{2,2})$ for denoising
Region 12, S1≤I≤0.5≤S2, application of combination $C_2=(D_2; J_{2,1})$ for denoising
Region 13, I≤S1 application of combination $C_1=(D_1; J_{1,i})$ for denoising
Region 14, S1≤I≤S2 application of combination $C_2=(D_2; J_{2,1})$ for denoising
Region 15, S1≤I≤S2 application of combination $C_2=(D_2; J_{2,1})$ for denoising
Region 16, I≤S1 application of combination $C_1=(D_1; J_{1,i})$ for denoising As a reminder:
$C_1=(D_1; J_{1,1})$ Gaussian filter ($D_1$) with kernel size=5 ($J_{1,1}$)
$C_2=(D_2; J_{2,1})$ 2DFFT filter ($D_2$) with block size=32, overlap size=8, and strength=4 ($J_{2,1}$)
$C_3=(D_2; J_{2,2})$ 2DFFT filter ($D_2$) with block size=32, overlap size=16, and strength=4 ($J_{2,2}$)

Figure 3A:
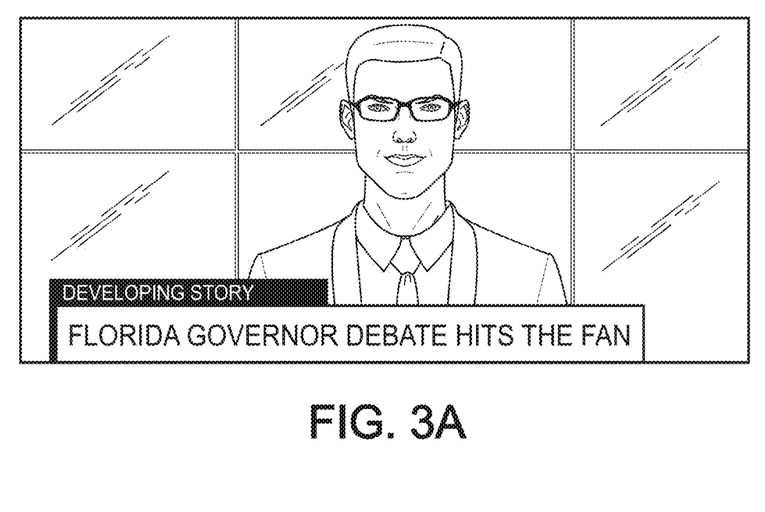
FIG. 3A represents an original image to be denoised.

FIG. 3A shows an original image to be denoised illustrating a television presenter. According to a second embodiment of the invention, in FIG. 3B this original image to be denoised is divided into 10 rectangular image regions of different sizes. The interest metrics $M_1$ and $M_2$ are defined for this second embodiment as being respectively the percentage of pixels detected as skin and the percentage of pixels having a motion vector whose magnitude is greater than 5.

There are therefore two interest metrics for this second embodiment of the invention.

Interest metric $M=\{M_1,M_2\}$

According to this second embodiment of the invention, the overall interest IG is determined in the following manner:

$IG=f(M_1,M_2)=M_2+2*M_1$

In this second embodiment, the end user is more interested in the presence of skin than in the magnitude of the motion vectors. Therefore, a weighting coefficient of 2 is applied to metric $M_1$ corresponding to the percentage of pixels detected as skin.

As the interest metrics $M_1$ and $M_2$ represent percentages, their respective values are between 0 and 100. Therefore, according to the above relation linking the overall interest IG to the interest metrics $M_1$ and $M_2$, the overall interest IG is between 0 and 300.

In the case where the overall interest IG is less than 50 for an image region, a mean filter with a kernel size of 5 is applied to denoise the image region. If the overall interest IG is between 50 and 150, a 2DFFT denoiser with a block size=32, an overlap size=8, and a strength=4 is applied to denoise the image region. Finally, if the overall interest IG is greater than 150, a FGD denoiser with strength=50 is applied to denoise the region.

As a reminder, X is the denoiser number, and $Y_i$ the number of parameter sets associated with denoiser $D_i$ where 1<i<3 for this second embodiment of the invention.

The number of possible combinations is therefore:

$$|C|=\Sigma_{i=1}^{X}Y_i=\Sigma_{i=1}^{3}Y_i=Y_1+Y_2+Y_3=1+1+1=3$$

In effect, in this second embodiment, each denoiser has a single associated parameter set.

We therefore have: $D=\{D_1, D_2, D_3\}$
$J_1=\{J_{1,1}\}$ set of parameter sets associated with denoiser $D_1$.
$J_2=\{J_{2,1}\}$ set of parameter sets associated with denoiser $D_2$.
$J_3=\{J_{3,1}\}$ set of parameter sets associated with denoiser $D_3$.
$C=\{C_1, C_2, C_3\}$ where C is the set of combinations $C_{x,y}$ by order of increasing complexity, with:
  $C_1=(D_1; J_{1,1})$ is the combination of denoiser $D_1$ with parameter set $J_{1,1}$
  $C_2=(D_2; J_{2,1})$ is the combination of denoiser $D_2$ with parameter set $J_{2,i}$
  $C_3=(D_3; J_{3,1})$ is the combination of denoiser $D_3$ with parameter set $J_{3,1}$ It is then possible to define the thresholds $S_i$ which are therefore in the number of:

$$|C|-1=3-1=2$$

The thresholds used are therefore the following: $S_1=50$ and $S_2=150$

Figure 3B:
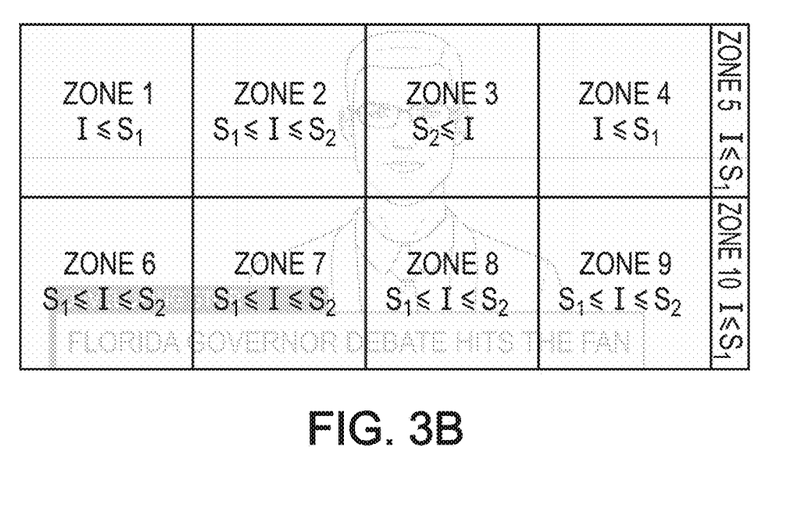
FIG. 3B represents an illustration according to a second embodiment of the invention.

In FIG. 3B, the original image divided into 10 regions of different sizes represents the comparison of the overall interest calculated for each of the 10 regions compared to the thresholds $S_1$ and $S_2$ defined above.

Region 1, I≤S1 application of combination $C_1=(D_1; J_{1,1})$ for denoising

Region 2, S1≤I≤S2 application of combination $C_2=(D_2; J_{2,1})$ for denoising

Region 3, S2≤I application of combination $C_3=(D_3; J_{3,1})$ for denoising

Region 4, I≤S1 application of combination $C_1=(D_1; J_{1,1})$ for denoising

Region 5, I≤S1 application of combination $C_1=(D_1; J_{1,1})$ for denoising

Region 6, S1≤I≤S2 application of combination $C_2=(D_2; J_{2,1})$ for denoising

Region 7, S1≤I≤S2 application of combination $C_2=(D_2; J_{2,1})$ for denoising

Region 8, S1≤I≤S2 application of combination $C_2=(D_2; J_{2,1})$ for denoising

Region 9, S1≤I≤S2 application of combination $C_2=(D_2; J_{2,1})$ for denoising

Region 10, I≤S1 application of combination $C_1=(D_1; J_{1,1})$ for denoising

Recall that:
$C_1=(D_1; J_{1,1})$ mean filter with kernel size of 5
$C_2=(D_2; J_{2,1})$ 2DFFT denoiser with block size=32, overlap size=8, and strength=4
$C_3=(D_3; J_{3,1})$ FGD denoiser with strength=50

Figure 5:
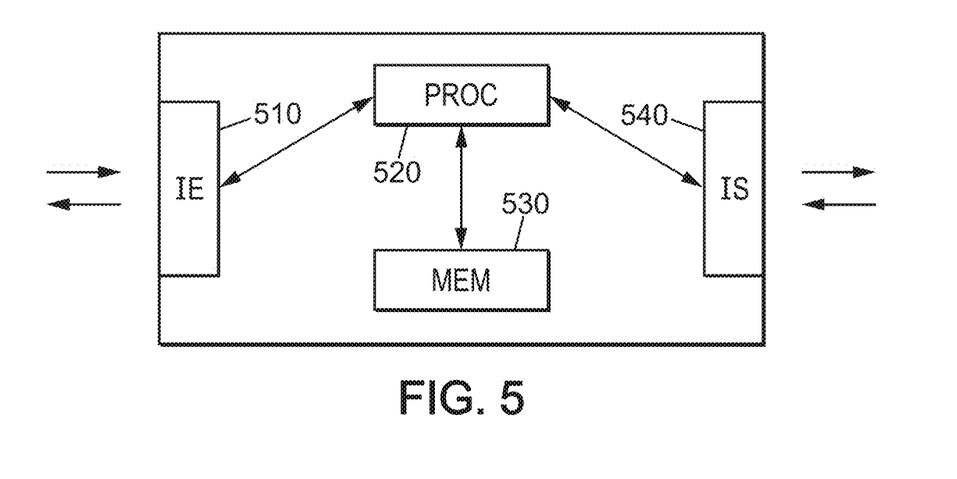

The invention can be implemented by a computing device, as illustrated in FIG. 5 by way of example, which comprises a processing circuit including:
  an input interface 510, for receiving the image data to be processed,
  a processor 520 cooperating with a memory 530, for processing the image data received, and
  an output interface 540 for delivering the image data processed by implementing the above method.

Said memory 530 can typically store code for the instructions of the computer program in the sense of the invention (an example flowchart is shown in FIG. 4, described above). These instructions can be read by the processor 520 in order to execute the method according to the invention. The device may further comprise working memory (separate from or identical to memory 530) for storing temporary data, in particular the calculated interest metrics.

The invention is not limited to the exemplary embodiments described above, provided only by way of example, but encompasses all variants conceivable to those skilled in the art and within the scope of the following claims. For example, the invention is not limited to the use of one or two interest metrics as described in the above embodiments.

The invention claimed is:

1. A method, implemented by a computer, for processing noise in a digital image having a plurality of image portions, the method comprising:
  for each portion of the digital image, based on criteria of interest for denoising selected details of any image portion of the digital image, each criteria of interest being specific to a metric, and based on a plurality of processing procedures to be applied to an image portion in order to denoise said selected details, each processing procedure having an efficiency related to an associated complexity level, said processing procedures being ordered by increasing complexity level:
  analyzing said image portion to quantify the presence of one or more of said selected details in the image portion, and calculating an overall interest of the image portion as a function of respective quantifications of the presences of said selected details, and
  comparing the overall interest at said complexity levels, in order to launch the processing procedure having the complexity level corresponding to the calculated overall interest.

2. The method according to claim 1, wherein the launched processing procedure is the one having the complexity level immediately above the calculated overall interest or having a maximum complexity level when the overall interest is greater than the maximum complexity level.

3. The method according to claim 1, wherein each processing procedure is defined by at least one processing type combined with a parameter set associated with the processing type, each possible combination of processing type and associated parameter set having a processing efficiency related to a pre-estimated complexity level, said possible combinations being ordered by increasing complexity level.

4. The method according to claim 3, wherein each processing procedure is defined by a plurality of combined processing types, each processing type having an associated parameter set, each possible combination of processing types having an overall processing efficiency related to a pre-estimated complexity level, said possible combinations being ordered by increasing complexity level.

5. The method according to claim 1, wherein thresholds $S_1, S_2, \ldots, S_{|C|-1}$ are predefined, each threshold being associated with a processing procedure providing a desired denoising efficiency for an associated complexity level, and the overall interest is compared to the thresholds.

6. The method according to claim 1, wherein K interest metrics $M_1, M_2, \ldots, M_K$, respectively associated with the selected details are calculated, each metric being specific to one of said criteria of interest.

7. The method according to claim 6, wherein the overall interest is calculated as a function of the K interest metrics $IG=f(M_1, M_2, \ldots, M_K)$.

8. The method according to claim 1, wherein the digital image is an image divided into N regions having the same dimensions.

9. The method according to claim 1, wherein the digital image is an image divided into N regions having different dimensions.

10. A non-transitory computer readable storage medium storing a computer-executable program comprising instructions for implementing the method according to claim 1.

11. A noise processing device configured to denoise a digital image including a plurality of image portions, the device comprising:
a processor configured to carry out the following operations, for each portion of the image, based on criteria of interest for denoising selected details of any image portion of the digital image, each criteria of interest being specific to a metric, and based on a plurality of processing procedures to be applied to an image portion in order to denoise said selected details, each processing procedure having an efficiency related to an associated complexity level, said processing procedures being ordered by increasing complexity level,
analyzing said image portion in order to quantify the presence of one or more of said selected details in the image portion, and calculating an overall interest of the image portion as a function of respective quantifications of the presences of said selected details, and
comparing the overall interest at said complexity levels, in order to launch the processing procedure having the complexity level corresponding to the calculated overall interest.

* * * * *